United States Patent [19]
Henry

[11] Patent Number: 5,680,806
[45] Date of Patent: Oct. 28, 1997

[54] COMPRESSIBLE FLUID FLOW CONTROL VALVE AND CONSTANT SPEED PNEUMATIC MOTOR APPLICATION THEREFOR

[76] Inventor: Michael F. Henry, 4504 W. Princeton, Broken Arrow, Okla. 74012

[21] Appl. No.: 702,744

[22] Filed: Aug. 23, 1996

[51] Int. Cl.$^6$ .................... F15B 11/08; F16K 31/145
[52] U.S. Cl. .................... 91/454; 81/468; 251/61; 251/205; 137/102
[58] Field of Search .................... 91/435, 454, 458, 91/468; 251/61, 205; 137/102, 494

[56] References Cited

U.S. PATENT DOCUMENTS

| | | | |
|---|---|---|---|
| 3,057,162 | 10/1962 | Lee | 60/53 |
| 3,067,693 | 10/1962 | Lambeck | 103/161 |
| 3,575,207 | 4/1971 | Denner | 251/206 X |
| 3,626,695 | 12/1971 | Jonsson | 60/53 |
| 3,987,625 | 10/1976 | Swatty et al. | 60/431 |
| 4,022,021 | 5/1977 | Russell | 60/420 |
| 4,040,437 | 8/1977 | Gottling | 137/102 |
| 4,196,588 | 4/1980 | Johnson | 137/102 X |
| 4,210,165 | 7/1980 | Kitsugi | 137/102 |
| 4,615,353 | 10/1986 | McKee | 137/102 |

FOREIGN PATENT DOCUMENTS 899179   5/1972   Canada .

*Primary Examiner*—Hoang Nguyen
*Attorney, Agent, or Firm*—Frank J. Catalano; Scott R. Zingerman

[57] ABSTRACT

A flow control valve has a gate connected between an operating fluid inlet and outlet. An actuator permits manual adjustment of the gate area to allow fluid to pass from the inlet to the outlet at a threshold rate of flow for a threshold pressure at the first inlet. A biasing mechanism cooperable with the gate and linearly responsive to variations in a control pressure applied to a control inlet of the valve constantly automatically readjusts the area of the gate in proportion to the control pressure. In a constant speed pneumatic motor application of the valve, the motor inlet pressure is applied to the control inlet of the valve and the motor outlet pressure is applied to the operating fluid inlet of the valve. A regulator connected to the motor inlet senses the pressure at the motor outlet. In operation, at idle, the threshold flow rate through the valve is selected by manual adjustment of the valve actuator or stem. The load is added and the motor outlet pressure decreases. The regulator senses the change and increases the motor inlet pressure accordingly. As the motor inlet pressure varies, the size of the valve gate varies proportionately so that the rate of fluid flow through the motor, and therefore the motor speed, remains constant.

19 Claims, 4 Drawing Sheets

COMPRESSIBLE FLUID FLOW CONTROL VALVE AND CONSTANT SPEED PNEUMATIC MOTOR APPLICATION THEREFOR

BACKGROUND OF THE INVENTION

This invention relates generally to valves and more particularly concerns a compressible fluid valve usable to maintain substantially constant long term operating speed in a pneumatic motor driving a variable load.

The load imposed on a pneumatic motor may vary considerably. If the input pressure to the motor is maintained constant, the operating speed of the motor will vary inversely with the load. Sometimes, it is desirable to maintain constant motor speed regardless of load variations. Various control systems have been developed for this purpose. They typically sense variations in the rate of motor shaft rotation and translate the sensed information into a pressure related condition information usable to maintain the rate of rotation as nearly constant as possible. It would be easier and less expensive to control the motor speed in direct response to the outlet pressure from the motor. Assuming a flow control valve were connected to the motor outlet, the operating speed of the motor could be maintained constant if the outlet pressure were maintained constant. An inlet pressure could vary with the load. But, if the operating fluid is compressible and the motor outlet pressure is to remain constant for varying loads, any flow control valve in the motor outlet circuit must have an automatic valve control responsive to the varying motor input pressure.

It is, therefore, an object of this invention to provide a valve having a flow rate which is proportional to a control pressure applied to the valve. It is also an object of this invention to provide a valve having a flow gate whose area varies automatically in proportion to a control pressure applied to the valve. A further object of the invention is to provide a valve which permits selection of a threshold flow rate through the valve which is independent of the control pressure applied to the valve. Another object of the invention is to provide a valve which permits selection of a threshold flow gate area which is independent of the control pressure applied to the valve. Yet another object of this invention is to provide a valve which has an operating fluid flow rate responsive to a variable control pressure applied to the valve. A further object of this invention is to provide a valve which maintains its operating fluid flow rate substantially constant over the long term in response to a variable control pressure applied to it. It is also an object of this invention to provide a valve which is usable to maintain the flow rate of a compressible fluid through a pneumatic motor substantially constant over the long term in response to variations in motor inlet pressure applied as a control pressure to the valve. Still another object of this invention is to provide a valve which is usable in a motor outlet flow path as a gate controlled by the motor inlet pressure to maintain the operating speed of a pneumatic motor substantially constant over the long term. An ancillary object of this invention is to provide a modified regulator usable with the valve as an inlet pressure control to the pneumatic motor.

SUMMARY OF THE INVENTION

In accordance with the invention, a flow control valve is provided in which a body has first and second inlets to and an outlet from a chamber therein with a gate connecting the first inlet and the outlet. An actuator connected to the gate extends externally of the body to permit manual adjustment of the gate area to allow fluid to pass from the first inlet to the outlet at a threshold rate of flow for a threshold pressure at the first inlet. A biasing mechanism cooperable with the gate and linearly responsive to variations in a control pressure applied to the second inlet constantly automatically readjusts the area of the gate in proportion to the control pressure.

In a preferred embodiment of the valve, a cylinder has an inlet extending radially inwardly and an outlet extending radially outwardly. A piston longitudinally reciprocable and axially rotatable within the cylinder has a passage alignable between the inlet and the outlet. The inlet and the passage form an orthogonally two dimensional gate. A stem connected in axial alignment to the piston and extending externally of the cylinder permits manual rotation of the piston to an angular threshold position to set one of the gate dimensions so that fluid passes from the radial inlet through the passage to the outlet at a threshold rate of flow for a threshold pressure at the radial inlet. A linear compression spring biases the piston within the cylinder to align the passage longitudinally in relation to the radial inlet. An axial inlet into the cylinder admits fluid under pressure against the piston head to bias the piston against the compression spring so as to constantly realign the passage in relation to the redial inlet and vary the other of the gate dimensions. Thus the area of the gate varies in proportion to the biasing pressure to vary the rate of flow of fluid through the radial inlet. The rotational threshold setting is independent of the axial variable position of the gate so that, regardless of the selected threshold position, the automatic change in gate area is always in proportion to the variation in the control pressure.

In a constant speed pneumatic motor application of the valve, a positive displacement motor having a motor inlet for receiving fluid at a variable motor inlet pressure and a motor outlet for passing fluid at a motor outlet pressure is connected to the valve. The motor inlet pressure is applied to the axial or control inlet of the valve and the motor outlet pressure is applied to the radial or operating fluid inlet of the valve. A regulator connected to the motor inlet is modified to sense the pressure at the motor outlet. In operation, at idle, the threshold flow rate through the valve is selected by manual adjustment of the actuator or stem. The load is added and the motor outlet pressure decreases. The regulator senses the change and increases the motor inlet pressure accordingly. As the motor inlet pressure increases, the size of the valve gate increases proportionately so that the operating volumetric flow rate through the motor, and therefore the motor speed, remains constant.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
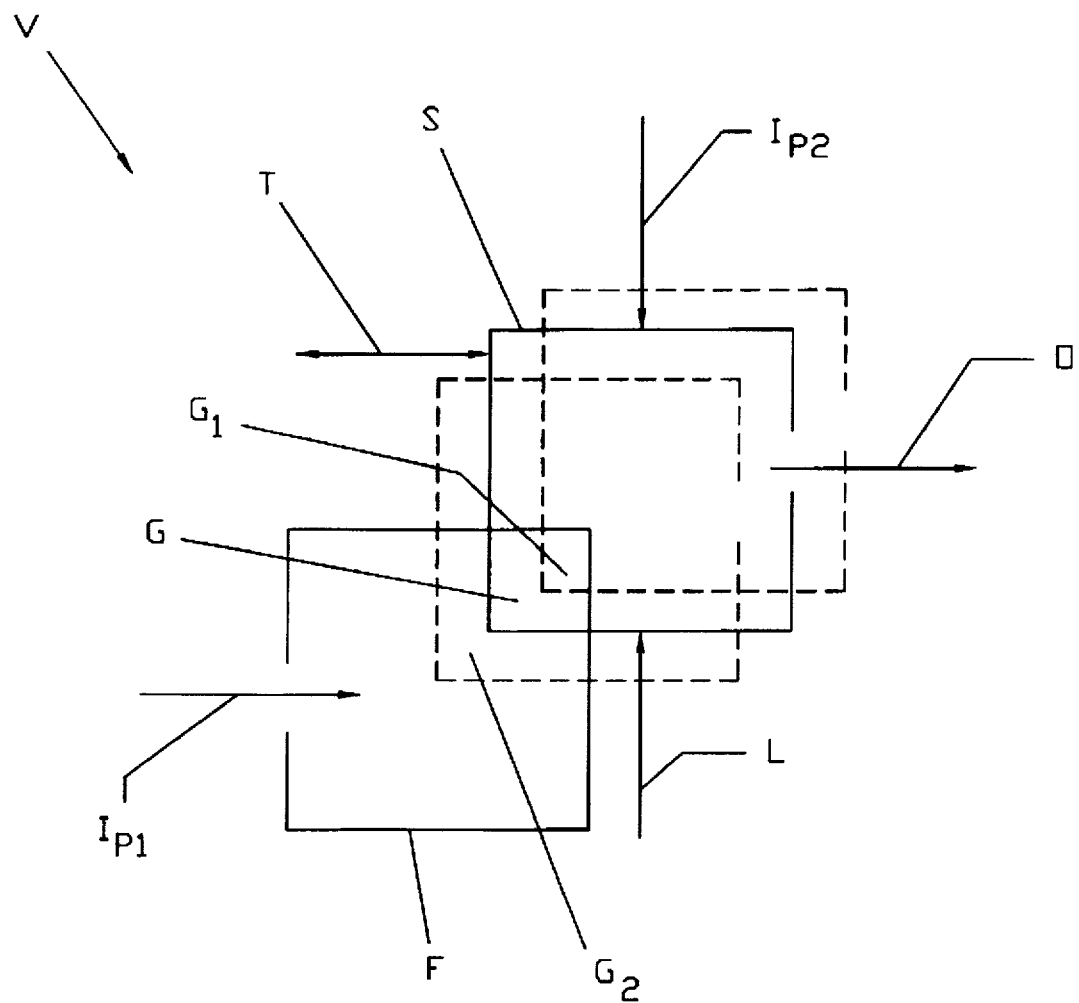
FIG. 1 is a diagrammatic illustration of the operation of the valve of the present invention.

DETAILED DESCRIPTION:

Turning first to FIG. 1, a valve V is illustrated in which a fixed passage F has a first inlet $I_{p1}$ which receives fluid under a first pressure $P_1$. The valve V also has a shifting passage S having an outlet O for exhausting fluid. The shifting passage S overlaps the fixed passage F to define a gate G through which the fluid is communicated from the fixed passage F into the shifting passage S. A means T for repositioning the shifting passage S allows a threshold area to be set for the gate G. That is, the horizontal or length component of the area of the gate G can be reduced or increased by operation of the repositioning means T, as exemplified by the shorter and longer gates G1 and G2, respectively. Thus, by manually adjusting the repositioning means T, the operator can set the threshold area of the gate G to suit the particular application for the valve V. With the threshold area of the gate G set, the shifting passage S is automatically vertically repositioned in response to a second pressure $P_2$ applied to the valve V at a second inlet $I_{p2}$ which, as shown, drives the shifting passage S downwardly as the pressure $P_2$ increases. The vertical position of the shifting passage S is also automatically controlled by a means L which causes the sliding passage P to move upwardly as the pressure $p_2$ decreases. The means L is linearly responsive to variations in and cooperates with the control pressure $P_2$ so as to automatically and constantly readjust the vertical position of the shifting passage S. Thus, the width of the gate G is automatically readjusted in response to the variations in the control pressure $P_2$. For example, at a relatively low control pressure $P_2$, the vertical position of the shifting passage S might result in a narrow width gate G1, while for a higher control pressure $P_2$ the shifting passage S is vertically downwardly driven to provide a significantly greater width gate G2. The characteristics of the linear means L are selected so that the area of the gate G is constantly readjusted in proportion to the control pressure $P_2$ exerted at the shifting passage inlet port $I_{p2}$. The horizontally established threshold area setting is independent of the vertically established pressure responsive area so that, regardless of the selected threshold position, the automatic change in gate area is always linearly proportional to the variations in control pressure $P_2$.

Figure 2:
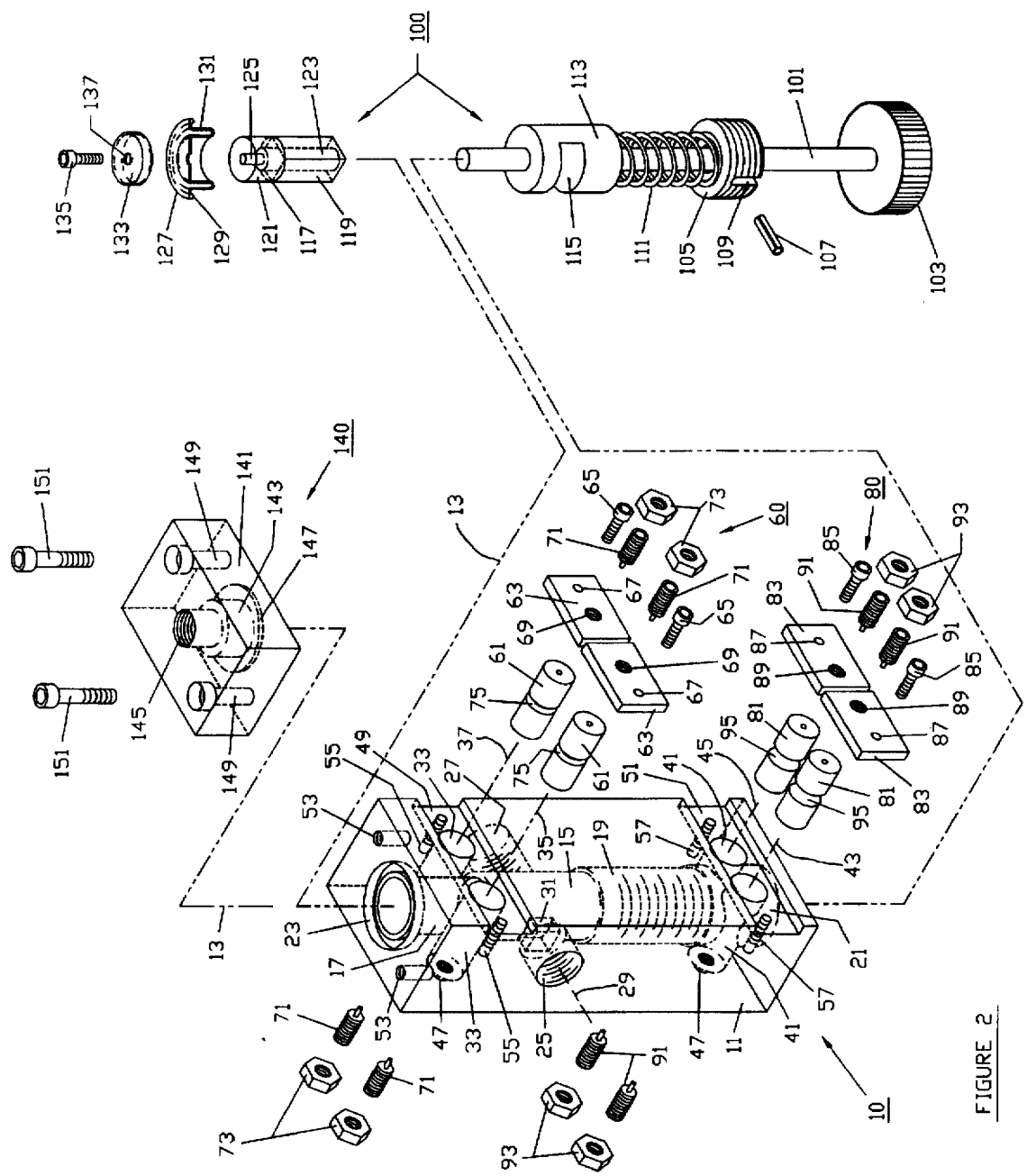
FIG. 2 is a perspective assembly view of a preferred embodiment of the valve of the present invention.
Figure 3:
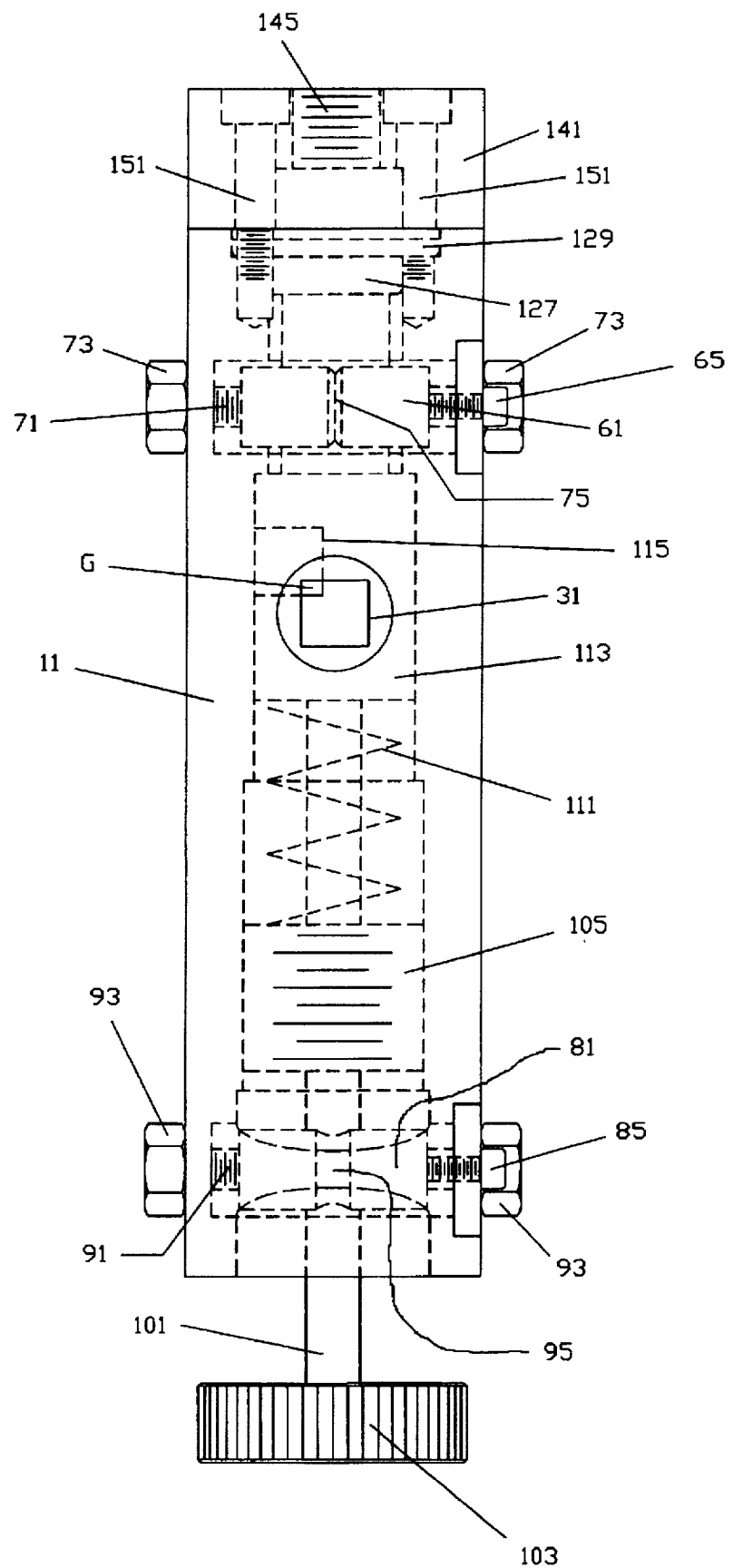
FIG. 3 is a side elevation view of the assembled view of FIG. 2.

A preferred embodiment of the valve V is illustrated in FIGS. 2 and 3. The valve housing 10 is a substantially orthogonal body 11, as shown aligned on a vertical axis 13, with several cylinders aligned end-to-end and extending through the body 11. A gate cylinder 15 extends concentrically about the vertical axis 13 in the mid portion of the body 11. A diaphragm cylinder 17 extends concentrically about the vertical axis 13 from the top of the gate cylinder 15 to the upper end of the body 11. A threaded spring chamber 19 extends concentrically about the vertical axis 13 from the bottom of the gate cylinder 15 toward the lower end of the body 11 with a wider diameter smooth cylinder 21 extending from the bottom of the spring chamber 19 to the lower end of the body 11. An annular seat 23 in the upper end of the body 11 is concentrically disposed around the diaphragm cylinder 17. A cylindrical inlet port 25 and a cylindrical outlet port 27 are aligned on a horizontal axis 29 which extends diametrically through the gate cylinder 15. The horizontal axis 29 is preferably orthogonal in relation to the body 11. The inlet port 25 extends from an outer wall of the body 11 toward the gate cylinder 15 and is connected to the gate cylinder 15 by an orthogonal passage 31, preferably square, the geometry of which is also preferably orthogonally oriented in relation to the body 11. The outlet port 27 extends from the other side of the gate cylinder 15 through the opposite outer wall of the body 11. Upper counter bores 33 extend into the body 11 on axes 35 and 37 which are transverse to both the body vertical axis 13 and the port diametric axis 29. The upper counter bore axes 35 and 37 are spaced so that the counter bores 33 symmetrically partially overlap the diaphragm cylinder 17 in the body 11. Lower counter bores 41 extend into the body 11 on axes 43 and 45 which are also transverse to both the body vertical axis 13 and the port diametric axis 29. The lower counter bores 41 symmetrically partially overlap the smooth cylinder 21 in the body 11. The back ends of the counter bores 33 and 41 are provided with threaded holes 47 which extend through the back wall of the body 11 and are concentric with the bore axes 35 and 37. The front ends of the counter bores 33 and 41 are aligned with horizontal kerfs 49 and 51 in the front face of the body 11. Diagonally spaced vertical threaded holes 53 extend into the upper face of the body 11 and horizontally spaced threaded upper holes 55 and lower holes 57 extend horizontally into the body 11 through the upper and lower horizontal kerfs 49 and 51, respectively.

The upper guide assembly 60 consists of a pair of rollers 61 of length and cross-section which compliment the bores 33. One roller 61 rotates within each of the upper counter bores 33 in the body 11. The rollers 61 are held within their respective counter bores 33 by plates 63 which are seated in the upper kerf 49 and fastened to the body 11 by screws 65 which extend through holes 67 in the plates 63 into the threaded upper kerf holes 55 in the body 11. Threaded holes 69 in the plates 63 align with their opposite holes 47 in the rear of the body 11. Threaded support pins 71 extend through the holes 47 and 69 in the body 11 and in the plates 63 into seats in the ends of the rollers 61 to serve as bearings for the rollers 61. The support pins 71 are retained in their desired position by lock nuts 73 threaded onto their outer ends. Each roller 61 has a circumferential right angle groove 75 which is symmetrically arranged in relation to a diametric cross-section of the roller 61, the size and location of the groove 75 to be hereinafter explained.

The lower guide assembly 80 mounted in the lower counter bores 41 includes rollers 81, plates 83, screws 85, plate fastening holes 87 and threaded holes 89, support pins 91, lock nuts 93 and grooves 95, all substantially the same as their above described upper guide assembly counterparts except that the annular grooves 95 are approximately semi-circular for reasons hereinafter explained.

The valve gate assembly 100 is substantially concentrically configured on a valve stem 101 to be inserted into the housing 10 on the vertical axis 13. A knob 103 is provided on the lower end of the stem 101. A nut 105 is slidably disposed for vertical reciprocal motion on the stem 101. A roll pin 107 extends through a radial slot 109 in the nut 105 and is fixed to the stem 101 so as to prevent relative rotation between the stem 101 and the nut 105 while permitting and guiding vertical reciprocation of the stem 101 within the nut 105. The nut 105 is sized to screw into the threaded spring chamber 19 in the body 11. A linear compression spring 111 is seated on the nut 105 and a substantially cylindrical piston 113 fixed to the stem 101 above the spring 111 is sized to rotate and reciprocate within the gate cylinder 15 in the body 11 as the stem 101 rotates and/or reciprocates. A substantially semi-cylindrical slot 115 is positioned in the piston 113 to reciprocate and rotate in relative juxtaposition with the square passage 31 in the body 11. The relative juxtaposition of the square passage 31 in the body 11 and the semi-cylindrical slot 115 in the piston 113 provide the orthogonal two-dimensional components which determine the area of the rectangular gate G, shown in FIG. 1, which controls the rate of flow through the inlet port 25 into the body 11. The above described portion of the gate assembly 100 is inserted into the body 11 through the smooth cylinder 21 and the nut 105 is threaded into the spring chamber 19. An adapter 117 with a lower portion 119 of square cross-section and an upper portion 121 of circular cross-section has a vertical central bore 123. The adapter 117 is inserted through the diaphragm cylinder 17 and is seated on top of the piston 113 with the upper end of the stem 101 in the bore 123. A threaded vertical hole 125 is also provided in the upper end of the adapter 117. A top-hat diaphragm 127 inserted into the diaphragm cylinder 17 has an annular outer bead 129 which rests in the annular seat 23 in the top of the body 11. The cylindrical wall 131 of the diaphragm 127 rolls up and down to vary its length as the adapter 117 reciprocates in the valve. A diaphragm retainer 133 compresses the central portion of the diaphragm 127 on top of the adapter 117 to form a seal and is held in place by a screw 135 which extends through a hole 137 in the retainer 133 and a hole in the diaphragm 127 and threads into the hole 125 in the adapter 117.

The cap 140 is a substantially orthogonal body 141 with a diaphragm cylinder extension 143 aligned on the valve body axis 13 and extending upwardly from its bottom end. A threaded air passage 145 extends from the top of the cap 140 into the diaphragm cylinder extension 143. An annular boss 147 protrudes downwardly from the cap 140 for insertion into the annular seat 23 in the body 11. Holes 149 in the cap 140 aligned with the threaded holes 53 in the top of the body 11 receive screws 151 to fasten the cap 140 to the housing 10 and compress the bead 129 on the diaphragm 127 between the cap 140 and the housing 10 to seal the air flow path from the passage 145 to the diaphragm cylinder 17. The right angle groove 75 in the upper rollers 61 and the semi-circular groove 95 in the lower rollers 81 are sized and positioned to guide the movement of the square portion 119 of the adapter 117 and the stem 101, respectively, in reciprocal vertical motion along the longitudinal axis 13 of the valve V.

In using the assembled valve V, rotation of the valve knob 103 causes the stem 101 and the nut 105 to rotate in the threaded spring chamber 19. This in turn changes the rotational position of the slot 115 in the piston 113 with respect to the square passage 31 at the valve inlet 25. As a result, the horizontal component of the dimensions of the gate G is determined by the position of the valve knob 103. When pressure is applied through the threaded control passage 145, the top hat diaphragm 127 cooperates with the adapter 117 to drive the piston 113 vertically against the linear counterforce of the spring 111. This causes the piston 113 to be realigned vertically in the gate cylinder 15 so as to adjust the vertical component of the gate dimensions in a manner linearly proportionate to the force applied to the piston 113.

Figure 4:
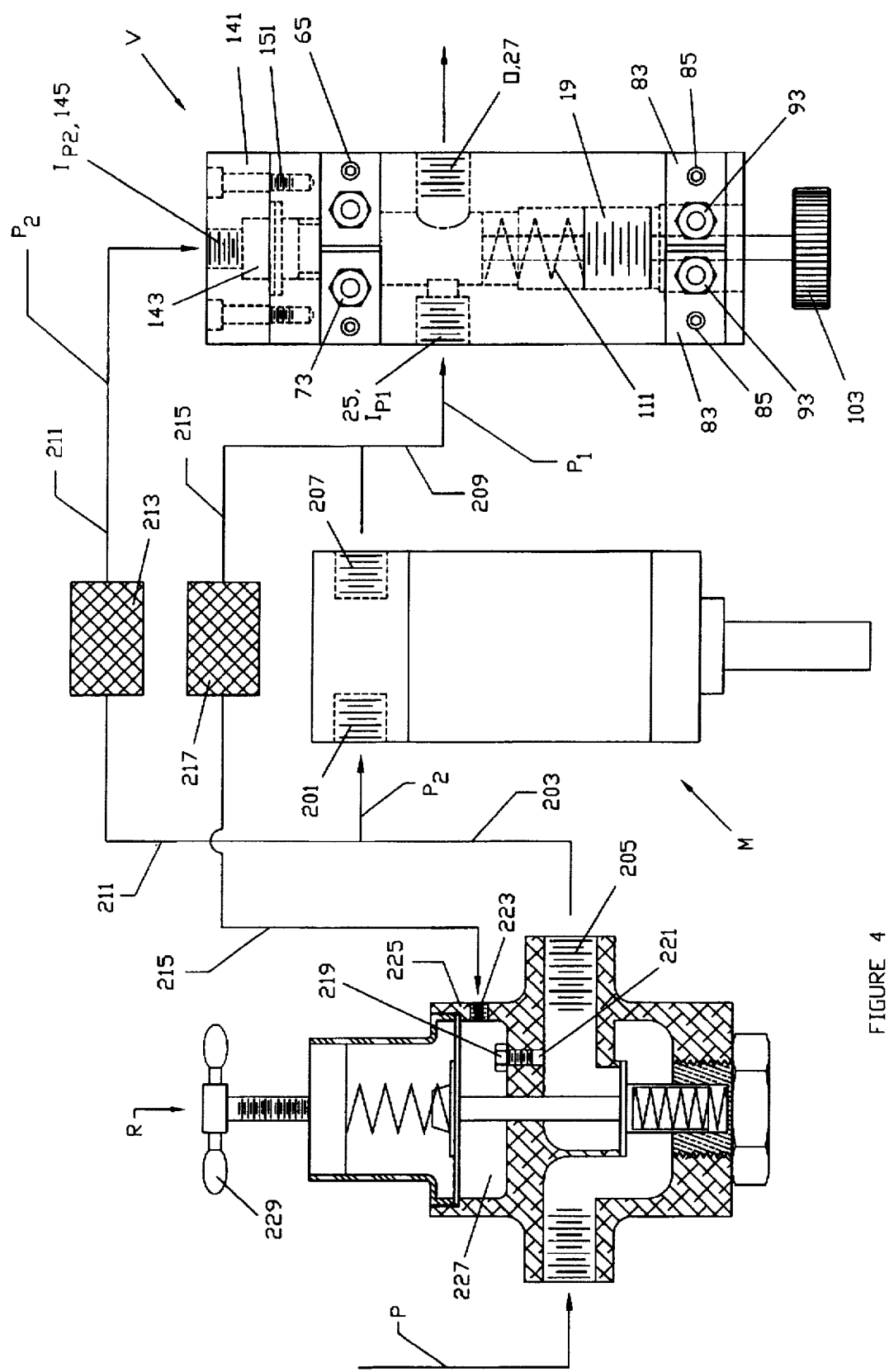
FIG. 4 is a partially schematic and partially cross-sectional illustration of the valve of FIG. 2 in a constant speed pneumatic motor application using compressible fluid as an operating mechanism.

Looking at FIG. 4, a constant speed pneumatic motor application of the valve V is illustrated. In this application, the pneumatic motor M has a fluid inlet 201 which is connected by a supply line 203 to a fluid outlet 205 of a regulator R. The fluid outlet 207 of the motor M is connected by an outlet line 209 to the inlet 25 of the valve V. The input pressure $P_2$ to the motor inlet 201 is also applied via control pressure line 211 to the control air inlet 145 to the valve V.

Preferably, this is accomplished through a chamber 213 containing glass wool fibers. The outlet pressure from the motor outlet 207 is also sensed by the regulator R through a sensing line 215. Preferably, the sensing line 215 also includes a chamber 217 containing glass wool fibers. The regulator R may be any well known regulator except that a plug 219 has been added to seal the existing sensing port 221 and a new sensing port 223 is provided through the wall 225 of the regulator control chamber 227. With the regulator R, pneumatic motor M and flow control valve V thus connected, the regulator handle 229 is operated to establish a threshold motor outlet pressure $P_1$. With this done, the pneumatic motor M is run in a no-load condition. The valve knob 103 is then adjusted to establish the threshold area of the gate G which thus establishes the threshold fluid flow rate through the gate G and thus the running speed of the motor M. A load is then coupled to the motor M which will result in a slight reduction in the motor running speed, which in turn results in a reduction of the threshold inlet pressure $P_1$ to the valve V. This change is sensed by the regulator R via the sensing line 215 and in response the regulator R increases the inlet pressure $P_2$ to the motor M causing the output torque to increase in opposition to the load which will permit the running speed of the motor M to remain constant. An increase in the inlet pressure $P_2$ will cause a proportional increase in mass flow rate through the motor M running at constant speed. To accommodate for the increase in mass flow rate, the area of the gate G must also increase in the same proportion as the increase in absolute motor inlet pressure $P_2$. The pressure $P_2$ applied to the head of the piston 113 is linearly proportionately countered by the bias of the spring 111, causing the area of the gate G to adjust so as to maintain the inlet pressure $P_1$ to the valve V, which is the same as the outlet pressure $P_1$ from the motor M, to be maintained substantially constant over the long term and therefore maintain the operating speed of the motor M constant.

Thus, it is apparent that there has been provided, in accordance with the invention, a compressible fluid flow coupler valve and constant speed pneumatic motor application that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A valve comprising:
    a body having first and second inlets to and an outlet from a chamber therein;
    a gate between said first inlet and said outlet;
    means connected to said gate and extending externally of said body for adjusting said gate to allow fluid to pass from said first inlet to said outlet at a threshold rate of flow for a threshold pressure at said first inlet; and
    means cooperable with said gate and linearly responsive to variations in a control pressure applied to said second inlet for constantly readjusting an area of said gate in proportion to said control pressure.

2. A valve according to claim 1, said gate being orthogonally two dimensional and said means connected to said gate varying a one of said orthogonal dimensions.

3. A valve according to claim 2, said means cooperable with said gate varying another of said orthogonal dimensions.

4. A valve comprising:

a cylinder;

an inlet and an outlet extending radially into and out of said cylinder;

a piston longitudinally reciprocable and axially rotatable within said cylinder;

a passage through said piston and alignable between said inlet and said outlet;

means connected to said piston and extending externally of said cylinder for rotating said piston to an angular position in which fluid passes from said inlet through said passage to said outlet at a threshold rate of flow for a threshold pressure at said inlet;

means responsive to a variable pressure for biasing said piston longitudinally within said cylinder for aligning said passage in relation to said inlet; and means for resiliently linearly biasing said piston against said variable pressure biasing means to realign said passage in relation to said inlet to vary said threshold rate of flow of fluid through said inlet as said biasing pressure varies.

5. A valve according to claim 4, said rotating means comprising a stem axially aligned with said piston.

6. A valve according to claim 4, said inlet being of orthogonal cross-section at an opening into and orthogonal in relation to said chamber.

7. A valve according to claim 6, said cross-section being square.

8. A valve according to claim 6, said passage being a semi-cylindrical slot.

9. A valve according to claim 4, said means responsive to a variable pressure comprising a second inlet into said chamber and means disposed between said second inlet and a head of said piston for driving said piston in response to said variable pressure applied at said second inlet.

10. A valve according to claim 4, said resiliently linearly biasing means comprising a compression spring.

11. A valve comprising:

a cylinder;

an operating fluid inlet and an outlet extending radially into and out of said cylinder;

a piston longitudinally reciprocable and axially rotatable within said cylinder;

a passage through said piston and alignable between said operating fluid inlet and said outlet;

a stem connected in axial relationship to said piston and extending externally of said cylinder for rotating said piston to an angular position in which fluid passes from said operating fluid inlet through said passage to said outlet at a threshold rate of flow for a threshold pressure at said operating fluid inlet;

a control inlet into said chamber for admitting fluid under variable pressure to variably bias said piston longitudinally within said cylinder and align said passage in relation to said operating fluid inlet; and a linear compression spring resiliently biasing said piston against said control inlet variable pressure to realign said passage in relation to said operating fluid inlet to maintain a substantially constant rate of flow of fluid through said operating fluid inlet as said control inlet pressure varies.

12. A constant speed pneumatic motor comprising:

a positive displacement motor having a motor inlet for receiving fluid at a variable motor inlet pressure and a motor outlet for passing fluid at a motor outlet pressure; and a valve comprising:

a body defining a chamber having an operating fluid inlet connected to said motor outlet, a control inlet connected to said motor inlet and a valve outlet;

a gate between said operating fluid inlet and said valve outlet;

means connected to said gate and extending externally of said body for adjusting said gate to allow fluid to pass from said operating fluid inlet to said valve outlet at a threshold rate of flow for a threshold motor outlet pressure; and means cooperable with said gate and linearly responsive to changes in said valve control inlet pressure for constantly readjusting an area of said gate in proportion to said motor inlet pressure to maintain an operating speed of said motor substantially constant.

13. A constant speed pneumatic motor according to claim 12 further comprising a regulator having an inlet for connection to an external source of fluid under pressure, an outlet for transmitting fluid under pressure from said regulator to said motor inlet, means for controlling said regulator outlet pressure and a control pressure inlet for connection between said motor outlet and said controlling means for maintaining said motor outlet pressure substantially constant.

14. A constant speed pneumatic motor according to claim 13 further comprising a chamber containing glass wool fibers connected between said regulator outlet and said valve control inlet.

15. A constant speed pneumatic motor according to claim 13 further comprising a chamber containing glass wool fibers connected between said regulator control inlet and said motor outlet.

16. A method for maintaining substantially constant operating speed in a pneumatic motor driving a variable load comprising the steps of:

supplying compressible operating fluid to an inlet of the motor at a variable motor inlet pressure;

venting compressible operating fluid from the motor outlet at a threshold pressure dependent on the variable motor inlet pressure and on the load driven by the motor;

controlling the rate of flow of the vented compressible operating fluid by passing said vented fluid through a gate of variable area;

varying the motor inlet pressure in response to changes in the threshold pressure at the motor outlet to maintain said threshold pressure substantially constant; and linearly varying the area of the gate in response to the variations in motor inlet pressure to maintain the volumetric rate of flow through the motor substantially constant.

17. A method according to claim 16, the gate being orthogonally two dimensional, said step of linearly varying the area of the gate comprising varying one of the orthogonal dimensions of the gate in proportion to the motor inlet pressure.

18. A method according to claim 17 further comprising the step of preselecting a threshold rate of flow of compressible operating fluid through the gate.

19. A method according to claim 18, said step of preselecting a threshold rate of flow of compressible operating fluid through the gate comprising presetting the other of the orthogonal dimensions of the gate.

* * * * *